United States Patent [19]

Lu et al.

[11] Patent Number: 4,461,715

[45] Date of Patent: Jul. 24, 1984

[54] THERMALLY ADDRESSED CHOLESTERIC-SMECTIC LIQUID CRYSTAL DEVICE AND COMPOSITION

[75] Inventors: Sun Lu, San Jose; David B. Chung, Santa Clara, both of Calif.

[73] Assignee: Minnesota Mining and Manufacturing Company, St. Paul, Minn.

[21] Appl. No.: 479,140

[22] Filed: Mar. 28, 1983

Related U.S. Application Data

[62] Division of Ser. No. 251,247, Apr. 6, 1981, Pat. No. 4,391,492.

[51] Int. Cl.$^3$ .............................. C09K 3/34; G02F 1/13
[52] U.S. Cl. ........................... 252/299.1; 252/299.01; 252/299.66; 350/350 S; 350/351
[58] Field of Search ............. 252/299.1, 299.01, 299.6, 252/299.61, 299.66, 299.7; 350/351, 350 S

[56] References Cited

U.S. PATENT DOCUMENTS

| | | | |
|---|---|---|---|
| 3,114,836 | 12/1963 | Fergason et al. | 350/351 |
| 3,524,726 | 8/1970 | Koster | 350/351 |
| 3,529,156 | 9/1970 | Fergason et al. | 350/351 |
| 3,792,915 | 2/1974 | Oh et al. | 350/346 |
| 3,796,999 | 3/1974 | Kahn | 350/350 S X |
| 4,032,219 | 6/1977 | Constant et al. | 252/299.1 |
| 4,059,340 | 11/1977 | Kahn et al. | 350/351 |
| 4,099,857 | 7/1978 | Hareng | 350/351 |
| 4,139,273 | 2/1979 | Crossland et al. | 252/299.1 X |
| 4,145,114 | 3/1979 | Coates et al. | 252/299.1 |
| 4,150,396 | 4/1979 | Hareng | 350/351 X |
| 4,196,974 | 4/1980 | Hareng et al. | 350/350 S X |
| 4,202,010 | 5/1980 | Hareng et al. | 350/351 |
| 4,219,255 | 8/1980 | Raynes | 350/350 S X |
| 4,278,328 | 7/1981 | Mukoh et al. | 252/299.1 X |
| 4,391,492 | 7/1983 | Lu et al. | 350/351 |

FOREIGN PATENT DOCUMENTS

| | | | |
|---|---|---|---|
| 65397 | 11/1982 | European Pat. Off. | 350/351 |
| 73701 | 3/1983 | European Pat. Off. | 350/350 S |

OTHER PUBLICATIONS

Tani and Ueno, "New Electrothermocoptic Effect. . . Smectic. . . Pleochroic," App. Phys. Lett. 33(4), Aug. 15, 1978, pp. 275-277.

Lu and Davies, "Thermally and Electrically Addressed Dye Switching LCDs," Mol. Cryst. Liq. Cryst., 1983, vol. 94, pp. 167-189.

Hareng et al., "Electric Field Effects on Biphenyl Smectic A LC", App. Phys. Lett., vol. 25, No. 12, Dec. 15, 1974.

Gray, McDonnell, "New Low-Melting Cholesterogens. . . ", Electronics Letters, Nov. 13, 1975, vol. 11, No. 23.

White, Taylor, "New Absorptive Mode Reflective Liquid-Crystal Display Device".

Tani et al., "New Electrothermo-optic Effect in a Certain Smectic Liquid Crystal with a Pleochroic Dye Added", *Appl. Phys. Lett.*, vol. 33(4), Aug. 15, 1978, American Institute of Physics.

*Primary Examiner*—Teddy S. Gron
*Assistant Examiner*—Catherine S. Kilby
*Attorney, Agent, or Firm*—Donald M. Sell; James A. Smith; William B. Barte

[57] ABSTRACT

A visual display device is featured which uses a new thermal addressing technique to provide a dark image upon a lighter background. The display is capable of being multiplexed to a large number of rows. The device comprises a cholesteric-smectic liquid crystal material mixed with a pleochroic dye of high order parameter. When the material experiences a transition from a higher to a lower, smectic thermal phase, two different textures or light states are developed; a transparent state and a light absorbing state. The transparent state is developed by applying a sensitizing voltage to certain portions of the medium. The pleochroic dye absorbs the light passing through the unsensitized portions of medium to provide the dark image. The row electrodes are made diffusely reflective so as to provide a double light pass through the medium to improve contrast.

5 Claims, 5 Drawing Figures

THERMALLY ADDRESSED CHOLESTERIC-SMECTIC LIQUID CRYSTAL DEVICE AND COMPOSITION

This is a division of application Ser. No. 251,247 filed Apr. 6, 1981, now U.S. Pat. No. 4,391,492.

FIELD OF INVENTION

The invention pertains to thermally addressable cholesteric-smectic liquid crystal display devices, and more particularly to thermally addressed visual display devices which use a light absorption technique to provide a dark image upon a lighter background.

BACKGROUND OF THE INVENTION

Heretofore, the ability to fabricate large scale multiplexed liquid crystal displays was very difficult. This difficulty was primarily due to "cross-talk" effects, and the necessity to quickly refresh the slowly responding liquid crystal medium. Large scale multiplexed displays notoriously have had problems with "cross-talk", i.e., the unwanted sensitizing of partially selected display elements. This problem results from the small root mean square voltage ratio between the "on" and "off" elements achievable in a large scale multiplexed liquid crystal display.

As displays become larger, a new problem appears. Most device effects do not have intrinsic storage. The display must therefore be repeatedly scanned to update; this is often with typical display effects done at 60 Hz (per frame). The result for large area matrices is a small duty cycle for each individual row or column. Most display media only partially respond to small duty cycle voltage information and the resulting effect is only a fraction of the dc equivalent voltage. The result is low contrast or brightness. As the display matrix gets larger, the duty cycle gets less and less and optical performance gets poorer and poorer. The result is a very poor (below commercial standards) optical performance as the X-Y matrix gets larger and larger.

These two problems have severely limited the ability to provide large scale multiplexed displays, and to date, no one has produced a device which has high contrast, wide viewing angle, which is easy to fabricate, easy to operate, and which has low cost.

The present invention has developed a low cost, large scale multiplexed, visual display device that has resolved the aforementioned problems, while providing a new liquid crystal device having many advantages over the prior art.

While the present invention is concerned primarily with large scale, thermally addressed multiplexed devices, its new light absorbing method is easily applicable to devices which are not large scale, and which do not utilize multiplexing. The subject invention is believed to have wide application in the field of thermally addressed liquid crystal displays, and is not considered as being limited to any particular device or system.

DISCUSSION OF RELATED ART

The invention features certain classes of smectic liquid crystal hosts that have a cholesteric phase upon heating. A small percentage of pleochroic dye is added to the material. The display is addressed in a thermal electric mode. For the "on" elements, the liquid crystal texture is light absorbing due to the dye which strongly absorbs incoming light. The "off" elements and the background have homeotropic smectic A texture, where the dye exhibits minimum absorption.

The concept of pleochroic dye switching as the Guest Host effect in nematic liquid crystals, was first suggested in an article to: G. H. Heilmeier, J. A. Castellano, and L. A. Zanoni, Mol. Crystals and Liquid Crystals 8, 293 (1969).

Others have suggested that the liquid crystal structure can be twisted nematic, homogeneous, or homeotropic. Most of these devices using pleochroic dyes mixed with the liquid crystal material have generally required external devices such as polarizers or wave plates to improve the contrast of the image.

Dyes of high order parameter in a cholesteric liquid crystal host were first suggested in an article to: D. L. White, G. N. Taylor, J. of App Phys. 45 4718 (1974).

Displays using this liquid crystal medium have high contrast and do not require external polarizers. These displays have high brightness and a wide viewing angle not available with the field effect twist nematic liquid crystal displays. Such devices use a cholesteric to nematic transition effect with liquid crystal displays. Such devices use a cholesteric to nematic transition effect with liquid crystals of positive dielectric anisotropy.

In the no field (off) mode, the dye molecules follow the helical structure of the host and exhibit strong light absorption. In the on condition, the dye is in a homeotropic nematic host and the absorption is minimized. Thus, the display presents a white image against a dark (or colored) background. A white image against a dark background is, however, generally not desirable. In addition, it has been well reported that such a cholesteric to nematic transition effect cannot be multiplexed above approximately 5-10 lines and give commercial performance. This is due to the change in the slope of the contrast versus voltage relationship that causes "cross-talk".

Recently, a paper was presented in the 8th International Liquid Crystal Conference at Kyoto, Japan by Professor A. Sasaki et al., entitled "Laser Addressed Liquid Crystal Multifunction Light Valve"; in which he described a laser addressed projection display utilizing a liquid crystal of 90:10 mixture of p-p' cyano-octyl biphenyl and cholesteryl nonanoate. The mixture should have a cholesteric phase followed by a smectic A phase upon cooling. However, the display is a projection device that derives its image contrast purely through scattering. The thermal addressing is by a scanning laser beam. No dyes are used in his material.

Recently, high order parameter and light stable dyes have become available. Devices using these dyes will provide viable displays for many applications. However, they have two major drawbacks which may restrict their application to simple displays of very low information content only.

These dye displays are very difficult to multiplex. Each a few rows represent a state of the art development. Large size matrix addressing has been achieved only by adding external non-linear elements to each display element.

For non-emissive (reflective) displays, a white image against a dark background is formed. This is esthetically undesirable and of limited commercial utility. Techniques to reverse the image contrast to a more pleasing dark against a light background are available, but the added complication increases the complexity and cost.

In 1978 C. Tani and T. Ueno discussed the application of pleochroic dyes to certain smectic liquid crystals in a scientific paper (Appl. Phys. Lett. Vol. 33 No. 4, 15 Aug. 1978). The authors, however, specifically teach against the use of the smectic "A" phase as having utility in the pleochroic dye system: they indicate that it has application only in scattering applications such as in laser addressed light valves. The concluded that only materials having smectic H or possibly B phase structure have useful properties in combination with pleochroic dyes. Further, they discuss the utilization of slow cooling as having utility with pleochroic dyes and that rapid cooling of the elements is only applicable to light scattering devices.

The present invention utilizes pleochroic dyes to produce an absorbing state rather than a scattering state and uses thermal XY local heating as distinct from the laser heating as described in other art. Further it utilizes rapid cooling of the element with liquid crystals preferentially of the smectic "A" phase. The last factor is directly against the teaching of Tani and Ueno, but has been found to be most effective in this application.

Also recently, a system has been reported in the French Literature, which uses a thermally addressed smectic "A" crystal medium. Such a system is described in an article entitled: MATRIX ADDRESSED SMECTIC LIQUID CRYSTAL DISPLAY: M. Hareng, S. Le Berre, R. Hehlen, and J. N. Perbet, Thomson-CSF Laboratoire Central de Recherches. Proceedings from Society of Information Display 1980 Conference, Late News Paper.

Such a system does not use dyes, and employs a scattering light technique, rather than a light absorption technique as described by this invention.

In addition, the system described is embodied in a very different device than detailed in this invention. Because of the crucial difference of the light scattering as compared to light absorption, the device can be viewed only through a *projection* optical system that results in a very bulky, power intensive system.

While the prior art teaches the use of pleochroic dyes of high order parameter for use in liquid crystal media, it should also be noted that these dyes are used primarily to enhance the light effects produced by the thermal phase transition of the media. The invention by contrast, relies upon the dye to do most of the light absorption for the crystal medium, the medium acting as a vehicle for orienting the dye to develop a light absorbing stance.

BRIEF DESCRIPTION OF THE INVENTION

The invention relates to a thermally addressed visual device which provides a dark image against a lighter background. The device comprises a liquid crystal medium including at least one cholestric liquid crystal compound mixed with at least one coloring agent, generally a pleochroic dye of high order parameter. The medium has positive dielectric anisotropy. The medium is thermally sensitive and has a transition between at least two thermal phases; the upper thermal phase is a cholesteric phase and a lower thermal phase is a smectic phase. The medium develops two textures in the smectic phase: a light absorbing texture and a homeotropic texture. The homeotropic texture is developed in portions of the medium by sensitizing the medium as it passes rapidly from the upper cholesteric phase to the lower, smectic phase. The light absorbing texture develops in the unsensitized portions of the medium as it goes through the transition to the smectic phase.

The medium is sensitized by applying a voltage to those portions of the medium to be addressed. The addressed portions develop a substantially transparent light state, while the unaddressed portions develop a substantially light absorbing state. The coloring agent or dye which is locked within the liquid crystal medium as it develops its light absorbing texture in the smectic phase will absorb most of the light passing through the medium; the liquid crystal acting as a vehicle to orient the dye molecules into a light absorbing position. Electrodes are provided to sensitize the medium. They are disposed adjacent the medium. Heating electrodes are also provided to heat the medium to an upper thermal phase. In a multiplexed device, these electrodes define a matrix of columns and rows disposed substantially at right angles to each other, and in different planes.

In order to obtain a pleasing direct viewable display, the row electrodes are made diffusely reflective to provide high contrast as well as wide viewing angle. The reflective electrodes provide for a double pass of light through the cell enhancing light absorbing.

The liquid crystal medium will generally contain an alkyl cyano biphenyl compound and will generally have two thermal transitions: between an isotropic and cholesteric phase, and between the cholesteric and a smectic "A" phase.

Many liquid crystal compounds with optically active terminal groups exhibit cholesteric phase. Some of them also exhibit one or more smectic phases when the compounds are cooled down from the cholesteric phase. For example, a paper published by Joseph A. Castellano, C. S. Oh, M. T. McCaffray, Mol. Crystal. Liq. Cryst., V. 27 pp 417, 1973, lists 40 Schiff base compounds with the general structure:

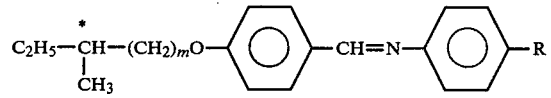

where: R=OCO—(CH$_2$)$_n$—CH$_3$ and C≡N

Many compounds with high value of m and n exhibit a cholesteric phase followed by smectic phases upon cooling. To cite a few examples, we have:

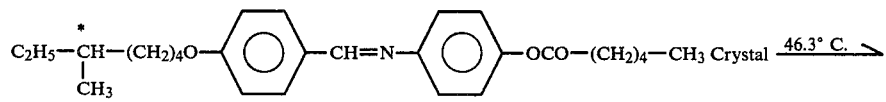

-continued

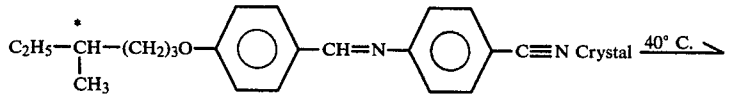

$$\text{Smectic} \xrightarrow{48°\text{ C.}} \text{Cholesteric} \xrightarrow{66°\text{ C.}} \text{Isotropic}$$

Although these compounds have the desirable phase transitions for device application, Schiff bases are generally not very stable. Also, there are other requirements that a practical material should have. Thus, typical working materials are formalized with stable compounds at suitable composition.

One of the requirements for the host liquid crystal is that its dielectric anisotropy should be strongly positive. This is usually obtained by using liquid crystal compounds having C≡N as one of the terminal groups.

One example of a workable cholesteric liquid crystal comprises a mixture of X, Y, and Z materials, each having a percentage by weight in an approximate range of: 40 to 60 of X; 30 to 50 of Y; and 5 to 15 of Z; respectively, where:

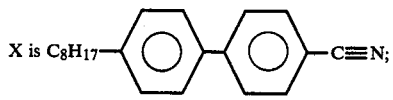

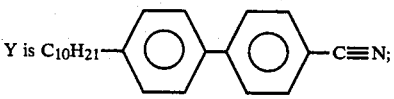

and

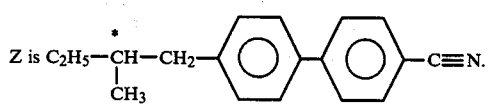

More particularly, the aforementioned mixture can comprise:

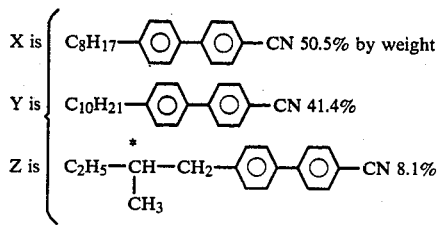

which has a phase transition as follows:

$$\text{Crystal} \longrightarrow$$
$$\text{Smectic} \xrightleftharpoons{34.5°\text{ C.}} \text{Cholesteric} \xrightleftharpoons{40.7°\text{ C.}} \text{Isotropic}$$

In a liquid crystal which has a smectic phase followed by a nematic phase, good display performance requires the temperature range of the nematic phase to be narrow. With cholesteric materials, however, the temperature range of the cholesteric phase does not necessarily have to be narrow.

To the host material, a high order parameter pleochroic dye or dye mixture is added in a range of approximately 0.5 to 3 percent by weight of the total composition.

More particularly, about 1% by weight of a purple dye having the formula:

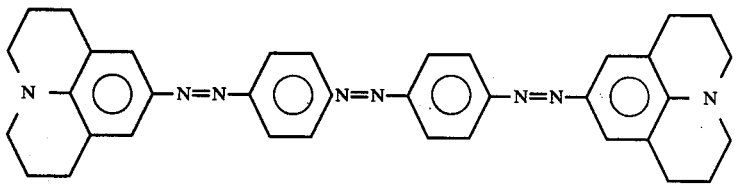

is added to the above cholesteric liquid crystal medium. This dye is sold by E. M. Laboratories, Elmsford, N.Y.

In operating the device, the liquid crystal medium is passed rapidly through its thermal transition from its upper cholesteric phase to its lower thermal, smectic phase. The transition must be accomplished reasonably rapidly, hence rapid thermal pulses are used that heat the liquid crystal locally but do not significantly heat the surrounding glass. Hence the natural cooling period immediately following the passage of the heat pulse is also rapid and hence the liquid crystal medium passes through the nematic phase rapidly. This greatly enhances the optical effect and results in greater contrast.

Certain portions of the medium are sensitized. These portions define the background of the medium. These sensitized portions develop the substantially light transparent state when the medium passes into the smectic thermal phase. The remaining unsensitized portions of the medium develop a light absorbing state. When light (generally ambient) is passed through the medium, the unsensitized portions absorb the light to provide a dark image upon the lighter sensitized background. The addressed portions of the medium may be sensitized in a chronological sequence.

When the liquid crystal material cools down either from the isotropic state through the cholesteric state to the smectic state, or from cholesteric to smectic state, the texture obtained in the smectic state depends on the cooling rate, surface alignment, the pitch of the cholesteric molecules and some other factors. The materials best suitable for this new device have molecular pitch in the 1–3 μm region. Most display devices have perpendicular alignment on both glass surfaces. This type of alignment is not absolutely necessary for this new display.

When the cooling rate is slow (for example less than 500° C./min) we have two cases:
(1) Cooling from the isotropic phase through a narrow (approximately 10° C. or less) cholesteric phase: a clear homeotropic texture is obtained.
(2) Cooling from the cholesteric phase to smectic phase: a scattering $S_A$ texture is obtained if the cooling rate is up to 100° C./min. region. With slower cooling rate, the clear homeotropic texture is obtained.

With fast cooling rate corresponding to the actual display operation (up to 250,000° C./min.), scattering textures are always obtained.

The scattering state obtained with fast cooling in the cholesteric to smectic system has finer structure as compared to those obtained with nematic to smectic system. When a pleochroic dye is added to the material, the scattering state becomes a light absorbing state. Because of its finer structure, the color is very deep.

BRIEF DESCRIPTION OF THE DRAWINGS

FIG. 4a depicts a homeotropic, substantially light transparent texture, and FIG. 4b illustrates a substantially light absorbing texture.

DETAILED DESCRIPTION OF THE INVENTION

Generally speaking, this invention relates to new methods, compositions, and visual devices utilizing the thermal addressing of cholesteric-smectic liquid crystal media. The visual devices of this invention feature a highly contrasted dark image on a lighter background.

Where the devices of the invention are multiplexed, they are capable of being multiplexed up to a large number of rows.

This invention provides new displays that incorporate pleochroic dyes of high order parameter into a smectic A liquid crystal material that has a cholesteric phase upon heating. By using a thermal electric addressing technique described hereinafter, this display has major advantages over the previously known dye switching displays.

A cholesteric liquid crystal with positive dielectric anisotropy can develop a homeotropic texture under the influence of an electric field. A homeotropic smectic A phase is formed, if the material is rapidly cooled through the phase transition. The homeotropic $S_A$ phase is clear or transparent and shows very little color (colorless) with dissolved pleochroic dye. Without an electric field, a light absorbing texture is formed in the medium. Thus, by controlling the electric field across the liquid crystal layer during the cholesteric to Smectic A phase transition, one can create at his will, either a colored state or a non-colored state. Once these states are formed, they are stable until erased by heating into the isotropic or cholesteric phase again.

Although the above description assumes that the material is heated into the isotropic state, it is noted that this is not absolutely necessary. In reality, only heating to the cholesteric state is needed. Also, due to the different physical mechanisms of forming the colored scattering state, the temperature range of the cholesteric state does not necessarily have to be narrow to ensure a good display performance.

Figures 4A, 4B:
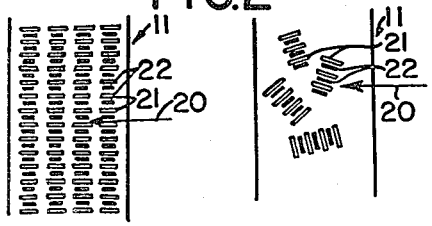
FIGS. 4a and 4b show a schematic view of two different light modulating textures developed in the cholesteric liquid crystal medium of the device of FIG. 1, when the medium passes rapidly into its smectic phase

The smectic A phase can be aligned homeotropically, as shown in FIG. 4a, if the surface of the display is treated with materials such as Lecithin. In this structure, the material is transparent.

There are two forms of thermally addressed smectic A displays. One type uses a scanning laser beam to address the display elements. The other type is x y matrix addressed. The row electrodes are heated sequentially with electric current and the display is written by applying voltages on the columns. During the writing process, only the dots associated to the row where the heating current has just been removed are affected. In other words, only the dots where the liquid crystal material is cooling to the smectic state respond to the writing pulses on the column electrodes.

As the liquid crystal material cools rapidly through the cholesteric phase to the smectic phase, it can form two different textures. With a voltage applied on the column, the liquid crystal material is switched to a homeotropic state during the cholesteric phase and assumes the transparent homeotropic smectic A texture after cooling is completed. Without the applied voltage, a light absorbing texture is developed instead. Thus, the dots associated with a cooling row electrode can be written into a transparent state or a light absorbing state by applying or not applying voltages on the columns. The cholesteric-smectic material used in the invention display device has positive dielectric anisotropy. The transition must be accomplished reasonably rapidly, hence rapid thermal pulses are used that heat the liquid crystal locally but do not significantly heat the surrounding glass. Hence the natural cooling period immediately following the passage of the heat pulse is also rapid and hence the liquid crystal medium passes through the cholesteric phase rapidly. This greatly enhances the optical effect and results in greater contrast.

The present invention, however, must be carefully distinguished from other similar systems wherein a scattering texture rather than a light absorbing texture is developed in the smectic material. Displays developing the scattering texture are generally not suitable for direct viewing, and are often used only in projection systems.

The optical contrast developed by a scattering texture against a transparent texture is similar to those obtained with the dynamic scattering effect. Under many commonly encountered illumination conditions, it will not give a pleasing, high contrast image.

The situation becomes quite different, however, when a pleochroic dye of high order parameter is introduced into the smectic A material. The dye becomes locked into the liquid crystal, and assumes the orientation of the liquid crystal molecules. The dye molecules in the scattering texture of the host absorb light strongly, transforming the normal scattering texture into a light absorbing texture, either deepy colored or dark, as shown in FIG. 4b. In the homeotropic smectic texture, the dye molecules have minimum absorption, since they do not absorb light incident upon the edge of their molecular structure. This texture, therefore, develops a transparent background. This results in a high contrast display that is suitable for direct viewing. No external polarizers are required. The addressing technique is substantially the same as smectic displays without the dye.

Figure 1:
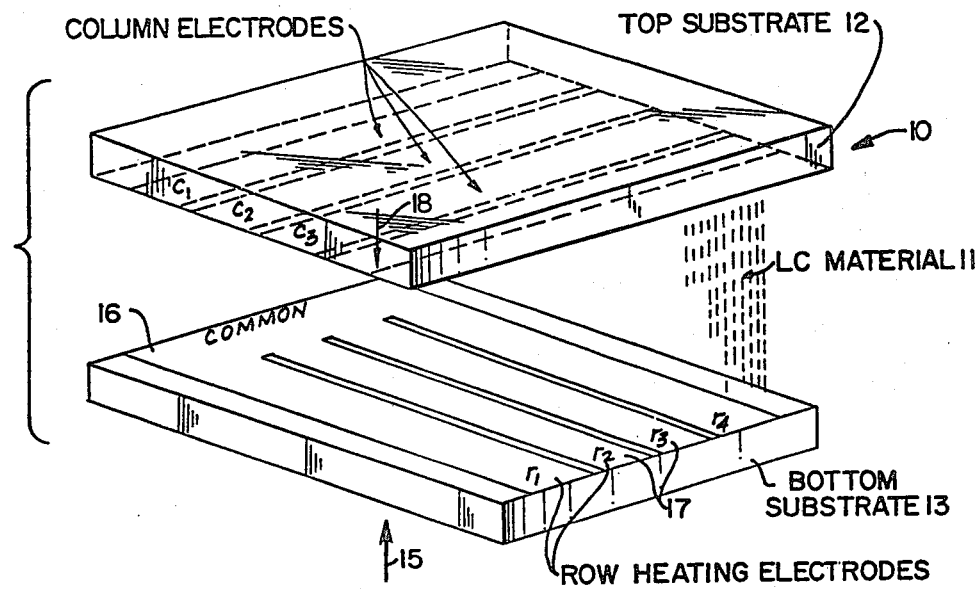
FIG. 1 is a perspective, exploded, schematic view of a visual device made in accordance with the invention.

Now referring to FIG. 1, an exploded view of a typical multiplexed, visual display device 10, is illustrated. The device comprises a cholesteric-smectic liquid crystal medium 11 containing the pleochroic dye, which material is disposed between two glass substrate plates 12 and 13, respectively. The top substrate plate 12 supports a plurality of column electrodes $C_1$, $C_2$, $C_3$, etc., which make up one half of the x y matrix for addressing the liquid crystal material 11. The column electrodes are made of electrically conductive, light transparent material such as indium tin oxide, which can be vacuum deposited on the glass plate 12.

The bottom plate 13 supports a plurality of row electrodes $r_1$, $r_2$, $r_3$, etc., which make up the remaining half of the x y matrix. The row electrodes are electrically conductive and are made diffusely reflective with material such as silver or aluminum. The row electrodes are designed to be diffusely reflective in order to provide good display image with wide viewing angle.

The liquid crystal medium 11 is generally sealed between the two substrate plates 12 and 13 with the electrodes in contact on either side. Light (generally ambient) is passed through (arrow 18) the glass composite, as shown.

Figure 2:
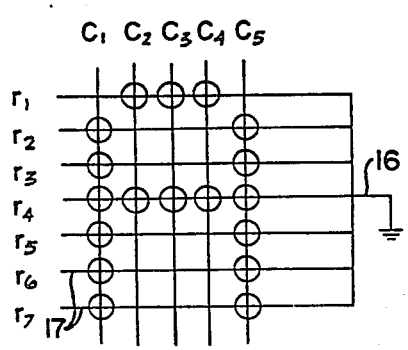
FIG. 2 is a plan schematic view of the device shown in FIG. 1, illustrating how an image can be formed in the cholesteric-smectic liquid crystal medium by a multiplexing technique.
Figure 3:
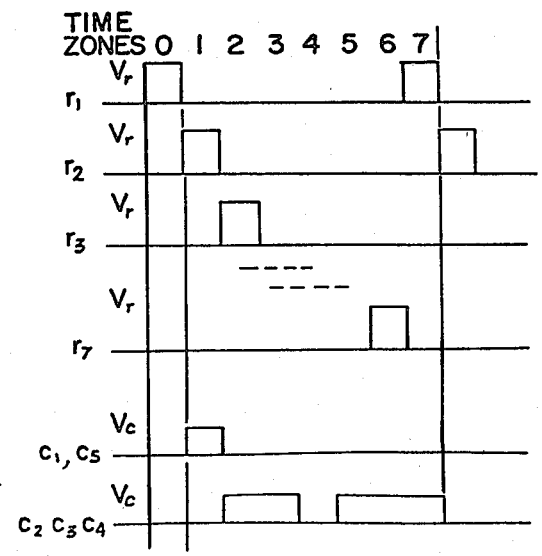
FIG. 3 is a graphical illustration of the chronological sequencing of the row and column electric waveforms of the device depicted in FIG. 1.

The physical operation of this display 10 can best be illustrated with a simple example of a 5×7 matrix displaying a character "A", as shown in FIG. 2. The rows of the matrix are tied together at one end to the common 16 and are sequentially heated by applying electric pulses to the other ends 17. In time zone 0, (see FIG. 3) row 1 is heated such that the liquid crystal material over the row 1 electrode $r_1$ is in the isotropic or cholesteric state. In time zone 1, row 2 electrode $r_2$ is heated. In the meantime, row 1 rapidly cools down and the dots associated with it are written by applying electric voltage on the column electrodes. In this example, electrodes $C_1$ and $C_5$ have voltage applied such that the dots $r_1c_1$ and $r_1c_5$ will be in the transparent state. $C_2$, $C_3$, $C_4$ have no voltage applied, and the dots $r_1c_2$, $r_1c_3$, $r_1c_4$ have a colored light absorbing texture. During time zone 2, row 3 electrode $r_3$ is heated and row 2 cools down, and the voltage on the columns assume the values corresponding to the "on" and "off" pattern of dots associated to row 2. The entire waveform for displaying a character "A", is shown in FIG. 2.

The colored light absorbing texture associated to the "on" dots is metastable and has long relaxation time generally over a few months. This texture can be automatically erased by heating the row during rewriting of the display. The light absorbing texture is not effected by the writing voltage applied on the column electrodes. This assures that "cross-talk" will not be a problem, and makes possible a large scale matrix display.

The erase-writing process for this display is very fast. Generally, less than a 100$\mu$ second writing time can be achieved. If the display is refreshed at $f_R$ times per second, the total number of rows that can be multiplexed will be $$M = \frac{1}{f_R \times T}$$

where T = the time required to write the row.

With $f_R = 30$ hertz, which is similar to the rate of a conventional CRT, and T = 100 m sec., we have n = 333 rows. Thus, the display can be multiplexed up to a rather large number of rows.

In practical display driving, the heating pulse can be applied over several time zones before the cooling and writing cycle. This lowers the voltage requirements for the heating pulses. However, the heating pulse should be short enough to avoid heat spreading to the neighboring rows and to minimize glass heating that inhibits rapid cooling.

A high contrast is achieved for the colored or black image due to the light absorbing character of the dye material vis-a-vis the transparent background.

The contrast is further improved by the diffusely reflective nature of the row electrodes, which provide a double light pass back through (arrow 15) the medium 11, wherein the unaddressed dye molecules in the light absorbing state (image) can absorb more light as compared to the addressed transparent background.

The medium 11 is depicted in the sensitized (addressed) homeotropic phase in FIG. 4a, and is shown in the unaddressed light absorbing phase in FIG. 4b. Light (arrow 20) entering the homeotropic material of FIG. 4a, passes between the liquid crystal molecules 21. The dye molecules 22 are not light absorbing in this phase, because they are locked in the crystal to confront the light rays upon their edge, as shown.

However, in the light absorbing phase, the dye molecules 22 are locked in the crystal molecules 21 in a randomly angled pattern, as shown in FIG. 4b. In this phase, the dye molecules 22 will strongly absorb the impinging light rays 20 to produce an intensely colored or dark image.

The crystal liquid medium 11 can be comprised of at least one alkyl cyano biphenyl compound.

More particularly, the liquid crystal will be comprised of a mixture of cyano biphenyl compounds of the following formulas:

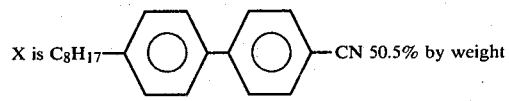

X is $C_8H_{17}$— CN 50.5% by weight

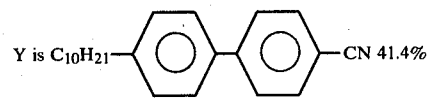

Y is $C_{10}H_{21}$— CN 41.4%

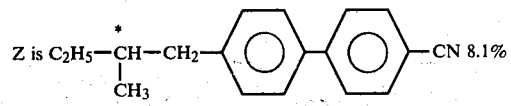

Z is $C_2H_5$—CH—$CH_2$— CN 8.1%
         |
         $CH_3$

One example of a workable cholesteric liquid crystal comprises a mixture of X, Y, and Z materials, each having a percentage by weight in an approximate range of: 40 to 60 of X; 30 to 50 of Y' and 5 to 15 of Z; respectively, where:

X is C$_8$H$_{17}$— 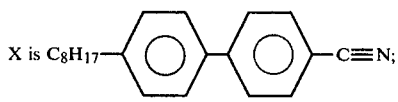 —C≡N;

Y is C$_{10}$H$_{21}$— 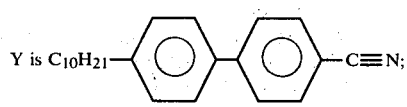 —C≡N;

and

Z is C$_2$H$_5$—*CH— 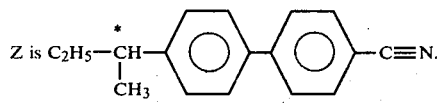 —C≡N.
        |
        CH$_3$

More particularly, the aforementioned mixture can comprise:

X is C$_8$H$_{17}$— 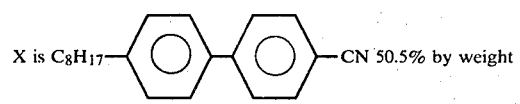 —CN 50.5% by weight

Y is C$_{10}$H$_{21}$— 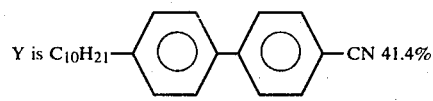 —CN 41.4%

Z is C$_2$H$_5$—*CH—CH$_2$— 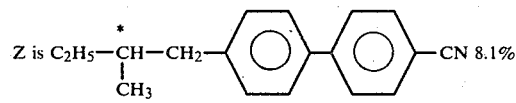 —CN 8.1%
        |
        CH$_3$ which has a phase transition as follows:

Crystal ⟶

Smectic ⇌$^{34.5°\ C.}$ Cholesteric ⇌$^{40.7°\ C.}$ Isotropic

In a liquid crystal which has a smectic phase followed by a nematic phase, good display performance, requires the temperature range of the nematic phase to be narrow. With cholesteric materials, however, the temperature range of the cholesteric phase does not necessarily have to be narrow.

To the host material, a high order parameter pleochroic dye or dye mixture is added in a range of approximately 0.5 to 3 percent by weight of the total composition.

More particularly, about 1% by weight of a purple dye having the formula:

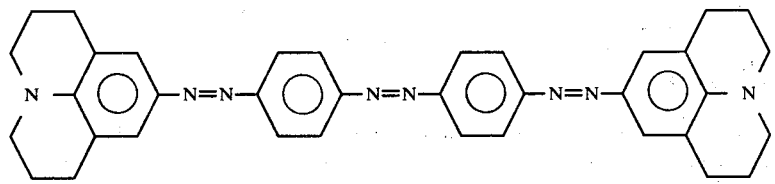

is added to the above cholesteric liquid crystal medium. This dye is sold by E. M. Laboratories, Elmsford, N.Y.

While the medium generally features pleochroic dyes of high order parameter, it is also contemplated that other coloring agents such as:

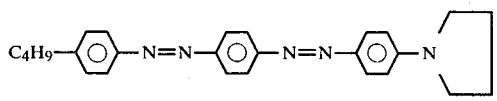

may also provide reasonable image contrast.

Having thus described the invention, what is desired to be protected by Letters Patent is presented by the following appended claims:

What is claimed is:

1. A liquid crystal composition which can be thermally addressed and which can provide a dark image upon a lighter background, comprising a mixture comprising approximately from 40 to 60 weight percent of "x" and approximately from 30 to 50 weight percent of "y", and approximately 5 to 10 weight percent of "z" wherein x, y, and z are represented by the formulas;

C$_8$H$_{17}$—  —CN;    x.

C$_{10}$H$_{21}$— 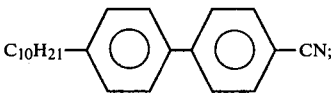 —CN;    y.

C$_2$H$_5$—*CH—CH$_2$— 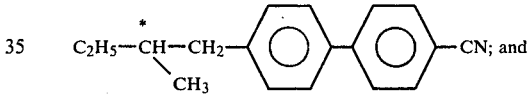 —CN; and    z.
        |
        CH$_3$ at least one pleochroic dye of high order parameter approximately from 0.5 to 3 weight percent based upon the total composition mixture.

2. The liquid crystal composition of claim 1, wherein said pleochroic dye comprises:

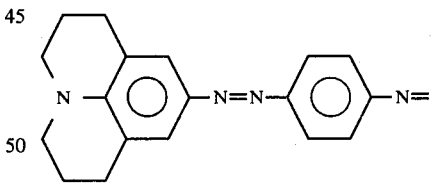

-continued
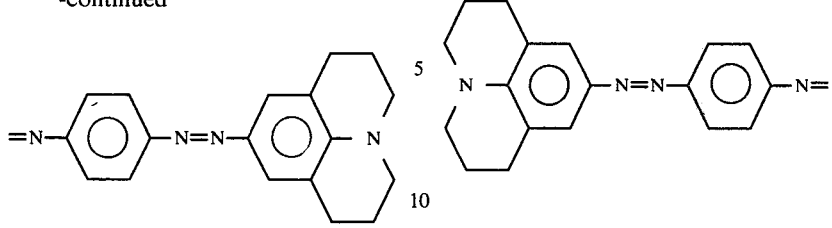
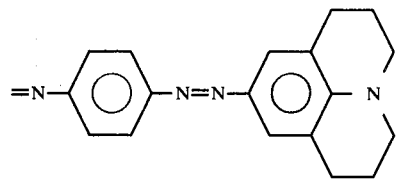
3. The liquid crystal composition of claim 1, comprising approximately 50.5 percent weight of x, 41.4 percent weight of y, and 8.1 percent weight of z.
4. The liquid crystal composition of claim 3 wherein said pleochroic dye comprises:
5. The liquid crystal composition of claim 4, wherein said dye is approximately 1 weight percent of the total composition mixture.
* * * * *